(No Model.)
D. O. PAIGE.
TURN TABLE FOR ELEVATED CARRIERS.
No. 457,822. Patented Aug. 18, 1891.
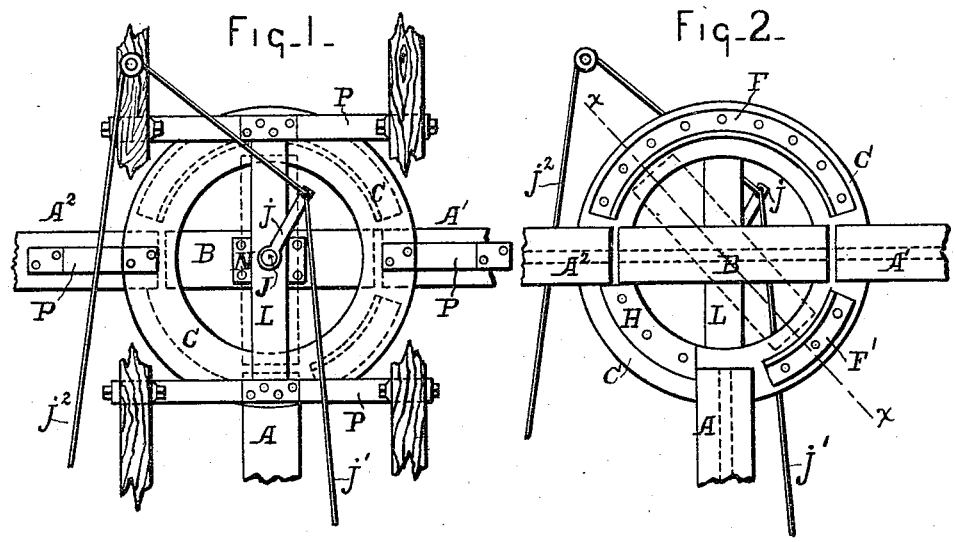
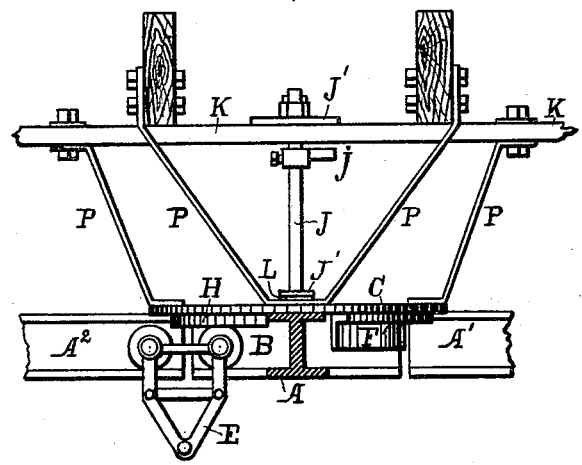
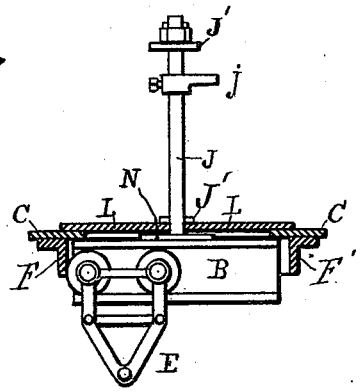
WITNESSES
L. A. Doelty
C. J. Shipley
INVENTOR
David O. Paige
By Wells W. Leggett & Co.
Attorneys.

UNITED STATES PATENT OFFICE.

DAVID O. PAIGE, OF DETROIT, MICHIGAN.

TURN-TABLE FOR ELEVATED CARRIERS.

SPECIFICATION forming part of Letters Patent No. 457,822, dated August 18, 1891.

Application filed September 11, 1889. Serial No. 323,664. (No model.)

*To all whom it may concern:*

Be it known that I, DAVID O. PAIGE, a citizen of the United States, residing at Detroit, county of Wayne, State of Michigan, have invented a certain new and useful Improvement in Turn-Tables for Elevated Carriers; and I declare the following to be a full, clear, and exact description of the invention, such as will enable others skilled in the art to which it pertains to make and use the same, reference being had to the accompanying drawings, which form a part of this specification.

In the drawings, Figure 1 is a plan view, looking down from above, of a turn-table for an elevated carrier illustrating my invention. Fig. 2 is a view of the same looking up from beneath. Fig. 3 is a side elevation showing the parts in position to permit the trolley to ride off from the turn-table onto a connecting track. Fig. 4 shows the same in side elevation with the table partly turned, as indicated by dotted lines in Fig. 2, illustrating how the trolley is prevented from running off from the turn-table while being turned from one track to another.

It is the purpose of my invention to produce a turn-table for a traveling overhead trolley, whereby the crane may be turned from one track to another at right angles or at any other angle therewith; also, the provision of means in connection therewith whereby the trolley is prevented from accidentally running off from the turn-table as the same is being turned.

In carrying out my invention, A, A', and A² represent intersecting overhead tracks along which the trolley is to travel.

B is the movable section of the track which constitutes the turn-table.

C is a plate or disk designed to hold the meeting rails and turn-table in proper relation to each other, and affording support for the guard-plates F F', which prevent the trolley E from running off the turn-table as it is being turned. It also supports the stop H, which arrests the movement of the table in both directions at the proper points to register with the rails.

J is an upright shaft to which the turn-table B is fixed. At its upper end this shaft is passed through a support K and its lower end passes through a plate or bar L. Suitable washers or other bearings J' are provided at the upper or lower support, or both, for sustaining the weight of the turn-table and the load it is called upon to carry, and braces P are provided, which assist to sustain these strains.

j is an operating-lever, and j' j² are cords attached to said lever for actuating the same. They may lead off to any suitable points and drop down within reach from the floor.

To operate this device, the trolley E is run onto the turn-table and the proper cord j' or j² is pulled, which turns the rail or turn-table B into line with the other rail. It is then run off onto the new line.

This device is of great convenience, as it enables the use of straight I-beams for the tracks about a shop. No curved track is necessary at the corners, and there being no curved corners the necessity for using a single-wheel trolley to facilitate turning the corners is obviated. With my device the corners are all square, the beams straight, and a trolley with two or more wheels on each side of the beam may be used without any attendant evils.

What I claim is—

The combination, with the intersecting tracks and a sectional track or turn-table pivoted at the intersection of said tracks and adapted to turn in proximity to the ends of and register with said intersecting tracks, of a vertical pivot for the sectional track or turn-table, supports for said turn-table and its pivot above the track-sections, a disk or plate adapted to hold the meeting rails and turn-table in proper relation to each other, the depending guards F F', a stop H, located below said plate, and an operating-lever connected with the turn-table pivot, substantially as shown and described.

In testimony whereof I sign this specification in the presence of two witnesses.

DAVID O. PAIGE.

Witnesses:
C. J. SHIPLEY,
A. J. BENES.